Oct. 21, 1958  H. BROWNING ET AL  2,857,175
PIPE FITTING CAPABLE OF ABSORBING TORSIONAL DEFLECTIONS
Filed March 15, 1955
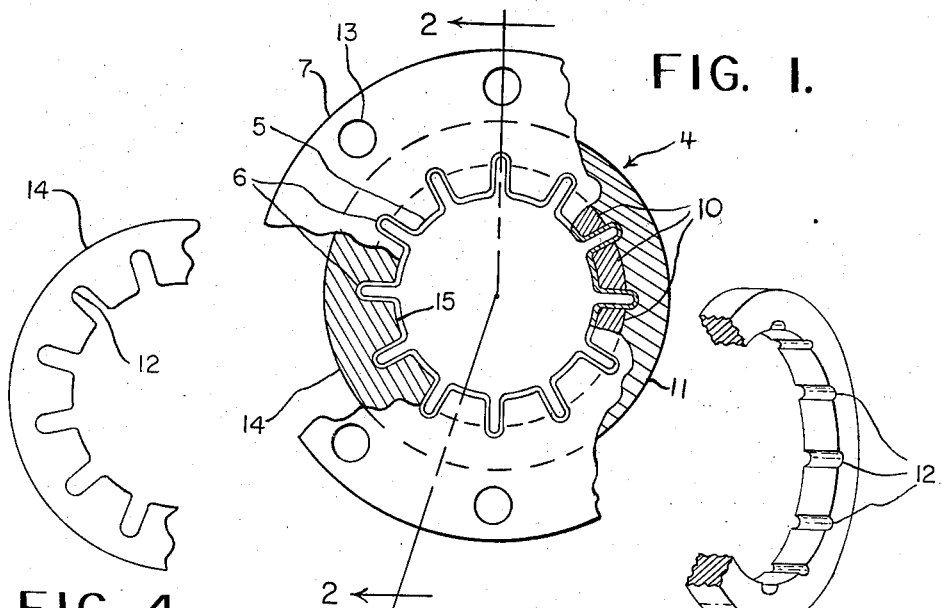
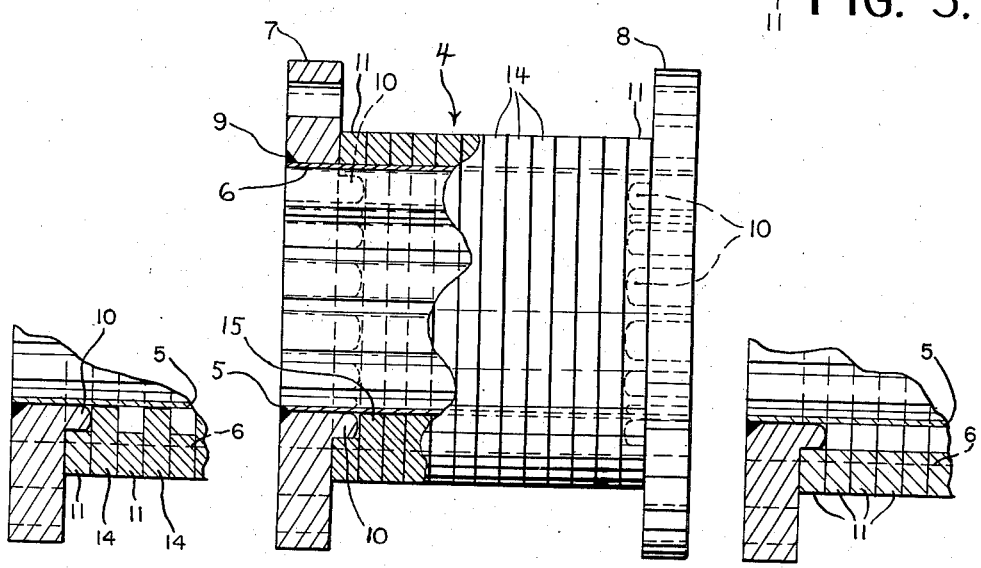
INVENTORS
HAROLD BROWNING
SIDNEY P. JOHNSON
BY George Sipkin
B. L. Zangwill
ATTORNEYS 2,857,175
PIPE FITTING CAPABLE OF ABSORBING TORSIONAL DEFLECTIONS Harold Browning, Bladensburg, Md., and Sidney P. Johnson, Washington, D. C.

Application March 15, 1955, Serial No. 494,584

4 Claims. (Cl. 285—45)

(Granted under Title 35, U. S. Code (1952), sec. 266)

The invention described herein may be manufactured and used by or for the Government of the United States of America for governmental purposes without the payment of any royalties thereon or therefor.

This invention relates to a flexible pipe fitting; and more particularly to a non-expansible fluid tight joint capable of absorbing torsional deflections while containing fluids under pressure.

Heretofore fittings designed to absorb torsional stresses consisted of telescoping sleeves ultizing a packing member between them which allowed relative rotation of the sleeves but prevented fluids therein from leaking out. The disadvantages of such fittings are obvious in that packings either wear out, are eaten away when the device is used in applications involving corrosive fluids or deform when subjected to high temperatures. Hence the applications of such fittings are limited by the nature of the packing used.

The fitting of this invention utilizes a flexible tubing having radially extending longitudinal corrugations formed thereon and welded to end flanges. Projecting into and between the corrugations for a predetermined distance are a plurality of fingers which are integral with the end flanges, and which serve to relieve the weld from carrying all of the torsional stress to which the tubing might be subjected. To prevent excessive radial expansion of the tubing a plurality of continuous rings having a corrugation fitting inner contour are provided. This structure renders the fitting flexible to torsional deflections transmitted to the corrugated member by the projecting fingers and prevents excessive radial distortion of the corrugated member through the use of interiorly contoured reinforcing rings.

The advantages of the invention are an inherently fluid tight fitting which requires no maintenance and which can be constructed of materials adapting it for diverse applications. The fitting also serves to dampen shock pressure waves traveling along the conduit system and eliminate the phenomenon known as water hammer.

Accordingly an object of the invention is the provision of a non-expansible fluid tight fitting.

Another object is to provide a non-expansible fluid tight fitting adapted to absorb torsional stresses.

A further object of the invention is the provision of a non-expansible fitting for a conduit system which will dampen shock waves traveling in the system.

A still further object is to provide a fluid tight fitting adapted to absorb torsional loads provided with means for preventing expansion of the fitting.

Other objects and many of the attendant advantages of this invention will be readily appreciated as the same becomes better understood by reference to the following detailed description when considered in connection with the accompanying drawings wherein:

Fig. 1 is an end view of the fitting with a portion of the flange cut away;

Fig. 2 is a side elevation of the fitting showing a partial section along lines 2—2; and Fig. 3 is a fragmentary perspective view of an element of the fitting.

Fig. 4 is a fragmentary view of another element of the fitting;

Fig. 5 is a fragmentary sectional elevation of a modification of the device; and Fig. 6 is a fragmentary section elevation of another modification of the device.

Referring now to the drawings, wherein like reference characters designate like or corresponding parts throughout the several views, there is shown in Figs. 1 and 2 a flexible pipe fitting 4 comprising a tubular sleeve 5 with radially extending longitudinal corrugations 6 formed thereon which permit the fitting to twist upon application thereto of torsional stresses. A pair of end flanges 7 and 8 are secured to the corrugated sleeve, as by a continuous weld 9. Integral with and disposed around the inner sides of the flanges parallel to the longitudinal axis of the fitting are a plurality of longitudinally extending fingers 10. Preferably these fingers project into each of the exterior troughs of the sleeve 5 for a predetermined distance although they might be adapted to project into the interior troughs of sleeve 5 as well. The purpose of these fingers is to relieve the weld from carrying the whole of the torsional load which might be applied to the fitting and to transmit and distribute such load to the corrugated sleeve.

Embracing the sleeve 5 are a pair of solid reinforcing rings 11 adjacent the end flanges 7 and 8 and a plurality of solid reinforcing rings 14. The rings 11 and 14 are similar in that each ring has a plurality of grooves 12 formed therein along their inner diameters of a number corresponding to the number of corrugations in sleeve 5. The shape or contour of the grooves 12 in rings 11 are such that they are complementary to the shape of the upper portions of the crests of the corrugations 6 formed on sleeve 5 while the shape or contour of the grooves 12 in rings 14 are complementary to substantially the whole exterior of the sleeve 5 and reach to the bottom of the trough as at 15 Figs. 1 and 2. All of the rings are spaced from each other by an amount determined by the amount of twist expected to be encountered in a particular application such that compensation is made for the tendency of the corrugated sleeve 5 to shorten under torsion or compression and to prevent the rings from shearing the corrugated sleeve 5. The purpose of rings 11 and 14 is to reinforce the corrugated sleeve 5 against radial forces which would cause expansion of said sleeve, while at the same time permit the corrugated sleeve to twist about its longitudinal axis. Each ring will assume a different angular relationship with respect to the others depending upon the twist of said corrugated fitting.

According to a desired performance characteristic the fitting may be modified as shown in Fig. 5 wherein a combination of rings 11 and 14 are disposed in alternate relationship or as shown in Fig. 6 wherein only rings such as 11 are utilized. The particular fitting disclosed herein may also be utilized in combination with other or conventional types of fittings to absorb complex motions.

Obviously other modifications, e. g. the use of a variety of end pieces in lieu of the flanged ends shown; and corrugations of various shapes and of multiple ply construction rather than the one ply shown may be made. Hence various modifications may be resorted to by those skilled in the art without departing for the spirit and scope of the invention as hereinafter defined by the appended claims, as only preferred embodiments thereof have been disclosed.

What is claimed is:

1. A non-expansible fluid tight fitting adapted to absorb torsional stresses while carrying fluids under high pressures comprising a tube having longitudinal corrugations thereon, flanges secured to the ends of said tube, fingers on said flanges projecting a predetermined distance into the outside troughs of said corrugations, and a plurality of rings spaced from each other surrounding the outer periphery of said tube substantially along its entire length, each of said rings having a plurality of recesses formed along its inner diameter adapted to receive the crests of said corrugations whereby the rings follow any twisting of said sleeve while preventing radial expansion thereof.

2. A non-expandable fluid tight fitting comprising a flexible longitudinally corrugated conduit, means for securing the ends of said conduit in a fluid carrying system, stress relieving means integral with said last named means and disposed about the periphery thereof projecting a predetermined distance into said corrugations, and means surrounding said conduit substantially along its entire length, said last named means comprising a plurality of spaced rings having an inner contour complementary to and intimately embracing said corrugations whereby each of said rings is adapted to restrict radial expansion and permit torsional movements by rotating an amount proportional to the torsional stress in the conduit portion it embraces.

3. A non-expansible joint adapted to absorb torsional forces while carrying fluids, comprising end flanges for securing said joint in a conduit system, said fitting comprising a tube having longitudinal corrugations thereon secured to said end flanges, projections on said end flanges extending into the troughs of said corrugations to distribute torsional forces along said corrugations, means encircling the corrugated tube having an inner contour such as to embrace said corrugations, said means comprising a plurality of rings having an inner contour embracing the crests only of said corrugations, and a plurality of rings having an inner contour embracing substantially the whole exterior of said corrugated sleeve; said means being adapted to twist with the corrugated tube upon application thereto of torsional forces while restricting expansion of said tube.

4. A non-expansible joint adapted to absorb torsional forces while carrying fluids, comprising end flanges for securing said joint in a conduit system, said fitting comprising a tube having longitudinal corrugations thereon secured to said end flanges, projections on said end flanges extending into the troughs of said corrugations to distribute torsional forces along said corrugations, means encircling the corrugated tube having an inner contour such as to embrace said corrugations, said means comprising a pair of rings having an inner contour embracing the crests only of said corrugations adjacent said end flanges and a plurality of rings having inner contour embracing substantially the whole exterior of said corrugated sleeve; said means being adapted to twist with the corrugated tube upon application thereto of torsional forces while restricting expansion of said tube.

References Cited in the file of this patent
UNITED STATES PATENTS

| | | |
|---|---|---|
| 338,848 | Lecouteux | Mar. 30, 1886 |
| 1,509,021 | Nehlig | Sept. 16, 1924 |
| 1,826,666 | Lawrence | Oct. 6, 1931 |
| 2,318,590 | Boynton | May 11, 1943 |
| 2,444,904 | Worley | July 6, 1948 |
| 2,677,393 | Cornelius | May 4, 1954 |